Jan. 25, 1966 T. I. PROKOPOWICZ ETAL 3,231,799

MODIFIED BARIUM TITANATE CERAMIC MATERIALS AND CAPACITOR

Filed Sept. 12, 1962 2 Sheets-Sheet 1

FIG. I

INVENTORS
THOMAS I. PROKOPOWICZ
HAROLD I. GELLER
BY Connolly and Hutz
THEIR ATTORNEYS

THOMAS I. PROKOPOWICZ
HAROLD I. GELLER
*INVENTORS.*

*BY*
Connolly and Hutz
THEIR ATTORNEYS 3,231,799
Patented Jan. 25, 1966

3,231,799

MODIFIED BARIUM TITANATE CERAMIC MATERIALS AND CAPACITOR

Thomas I. Prokopowicz, North Adams, Mass., and Harold I. Geller, Nashua, N.H., assignors to Sprague Electric Company, North Adams, Mass., a corporation of Massachusetts Filed Sept. 12, 1962, Ser. No. 223,105
8 Claims. (Cl. 317—258)

This invention relates to ceramic dielectric materials having a high dielectric constant which remains comparatively uniform over a broad range of temperatures.

Various titanates, exemplified by barium titanate, have proven quite valuable for use in forming ceramic bodies of extremely high dielectric constants. To these materials prior investigators have added various materials in an effort to improve their electrical properties. Considerable interest has centered on additives which are intended to control within narrow limits the temperature coefficient of dielectric constant. In one instance it has been taught to add minor amounts of sodium or potassium niobate (columbate) for this purpose. Subsequent experimentation has confirmed the efficacy of these materials for the intended purpose but have also brought to light a problem inherent in the use of sodium or potassium niobate.

In the course of firing $BaTiO_3$—$NaNbO_3$ ceramics, it was observed that weight losses during firing were somewhat greater than that generally observed during firing fine-grained $BaTiO_3$ ceramics. It was determined that the weight losses were due to sodium evaporation. Barium titanate is usually fired within the temperature range of 2200–2500° F. Since the sublimation temperature of $Na_2O$ is about 2327° F. this accounts for the substantial amount of sodium oxide lost during firing. The magnitude of the loss will vary depending upon the temperature, kiln drafts, the partial pressure of sodium in the kiln atmosphere, etc. Experience with potassium oxide, which vaporizes at a considerably lower temperature, has shown that under the same conditions about twice the amount is lost during firing.

This problem of sodium and potassium evaporation results in a lack of uniformity and uncertainty in the formation of titanate ceramics modified in the above manner. It is necessary to maintain a definite ratio, within narrow limits, between the constituents of the ceramic material in order to obtain a low coefficient of dielectric constant. It would be virtually impossible to compensate for the sodium or potassium loss by the addition of an excess of sodium or potassium niobate because of the many variables involved.

It is an object of the present invention to provide novel ceramic materials having comparatively stable electrical properties over a wide range of temperatures.

Still another object of this invention is to provide a ceramic material the constitution of which remains substantially constant during firing.

Yet another object of this invention is a novel capacitor having a temperature stable dielectric constant.

These and other objects of the instant invention will become apparent from the following description and drawing in which.

Figure 1:
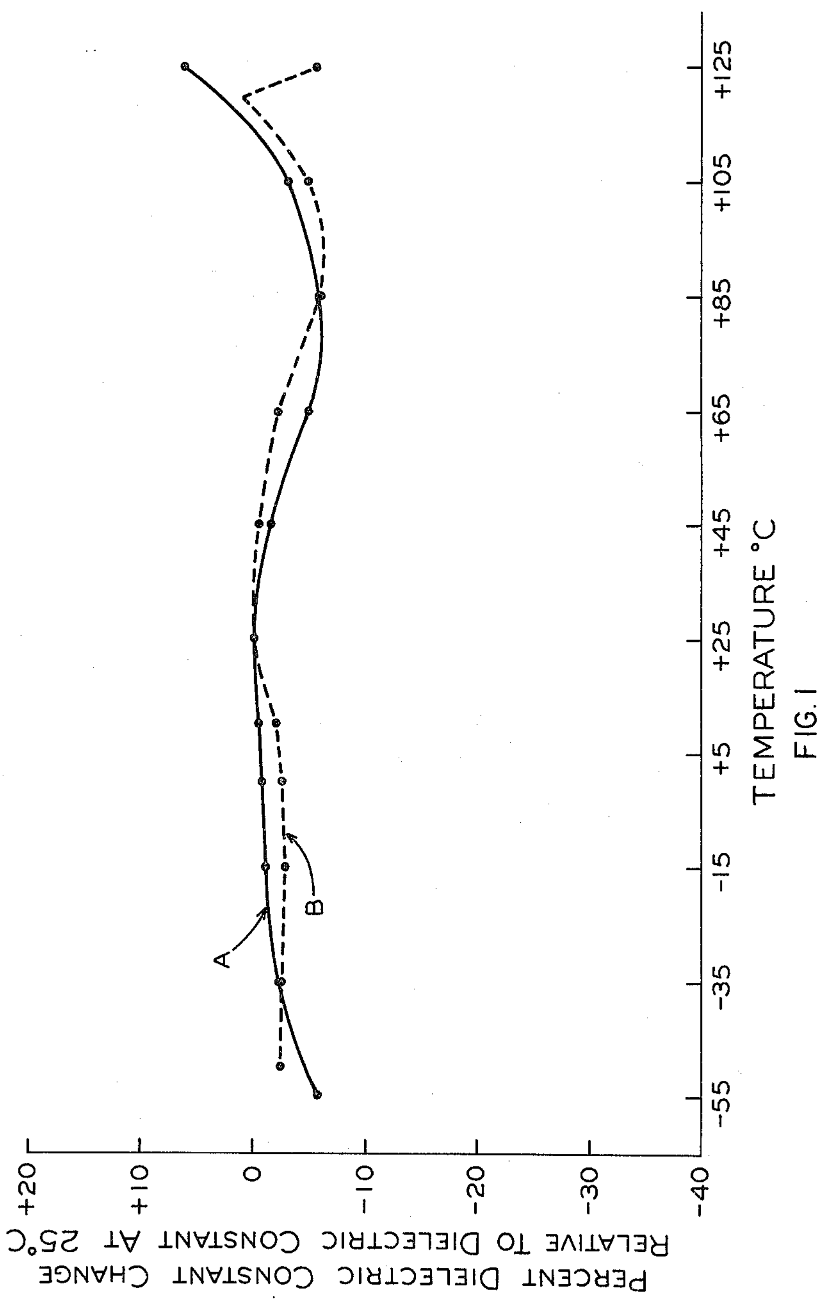
FIGURE 1 is a plot of the percentage change in dielectric constant of two of these novel ceramic compositions with respect to temperature.

The objects of the invention have been achieved by the addition of an effective amount of the oxides of lithium and niobium; iron and niobium; or lithium, iron and niobium to a barium titanate material. Tantalum oxide ($Ta_2O_5$) may be substituted for $Nb_2O_5$ in whole or in part.

Lithium oxide ($Li_2O$) has a melting point in excess of 3090° F., iron oxide ($Fe_2O_3$) has a melting point of 2849° F., niobium oxide has a melting point of 2768° F. and tantalum oxide has a decomposition point of about 2678° F., hence there is no significant additive loss during the firing of the subject ceramics.

The instant invention is illustrated by the following examples.

*Example I*

13.65 grams $BaTiO_3$ powder, 0.3988 gram $Nb_2O_5$ powder and 0.0240 gram $Fe_2O_3$ powder are placed into a 100-ml. wide-neck polyethylene bottle filled ⅓ with 0.4 inch ceramic milling spheres and containing 40 ml. of distilled water. The bottle with its contents is then rotated at 70 r.p.m for four hours until an intimate mixture of the powders in water is produced. The resulting slurry, after removing the milling spheres, is filtered under vacuum and the resulting cake is dried at 90° C. While the dry filter cake is at 90° C., 6 wt. percent of a paraffin binder is intimately blended therewith. The blend is forced through a 40-mesh screen to produce granules suitable for pressing. The granulated powder is pressed in a steel die between steel punches at 20,000 p.s.i to produce discs having a diameter of 0.52 inch and a thickness of 0.04 inch. The discs are set on a stabilized zirconia slab which is placed into a cool electric furnace. The temperature is raised over a period of 5 hours to 2320° F. and held there for 1 hour to accomplish sintering of the ceramic discs. The furnace is then permitted to cool to room temperature. Electrodes are applied to opposing faces of the discs in the form of a silver paint which on firing to 1300° F. firmly bonds itself to the ceramic.

Ceramic capacitor discs formed in the described manner have a dielectric constant of 2150 at 25° C. which does not vary more than ± 6% over the temperature range of −55° C. to +125° C. (see curve A of the drawing). At 25° C. the dissipation factor is 1.1%. The discs contained 97.0 wt. percent $BaTiO_3$ and 3.0 wt. percent $Nb_2O_5$ and $Fe_2O_3$. The mole ratio of $Nb_2O_5$ to $Fe_2O_3$ is 10:1.

Figure 2:
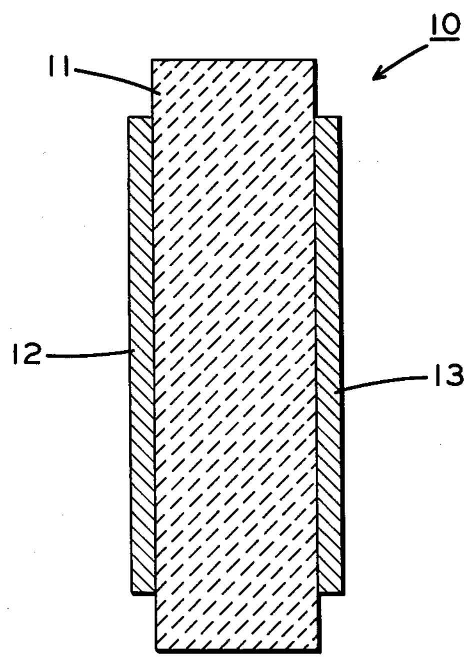
FIGURE 2 is a side view in section of a ceramic capacitor employing the dielectric of the present invention.

FIGURE 2 illustrates a capacitor of the foregoing example. The capacitor 10 comprises a ceramic dielectric disc 11 having metal electrodes 12 and 13 fired thereon.

*Example II*

15.92 grams $BaTiO_3$ powder, 0.2791 gram $Nb_2O_5$ powder, and 0.2070 gram $LiNbO_3$ powder are processed according to the procedure in Example I with the exception that sintering is accomplished at a temperature of 2370° F. for 1 hour.

Ceramic capacitor discs formed in this manner have a dielectric constant of 2000 at 25° C. which does not vary more than 7% over the temperature range of −55° C. to 125° C. (see curve B of the drawing). At 25° C. the dissipation factor is 0.85%. The discs contained 97.04 wt. percent $BaTiO_3$ and 2.96 wt. percent of $Nb_2O_5$ and $LiNbO_3$. The mole ratio of $Nb_2O_5$ to $Li_2O$ is 2.5:1.

The compositions contemplated comprise a major proportion of $BaTiO_3$, for example from 80 to 99%, and from about 1 to 8 weight percent based on the total composition of a member of the group consisting of $Nb_2O_5$ and $Fe_2O_3$; $Nb_2O_5$ and $LiNbO_3$; $Ta_2O_5$ and $Fe_2O_3$; $Ta_2O_5$ and $LiTaO_3$; and $LiTaO_3$ wherein the mole ratio of niobium oxide and tantalum oxide to iron oxide is from 2.5:1 to 25:1 and the mole ratio of niobium oxide and tantalum oxide to lithium oxide is from 1:1 to 10:1.

In order to insure uniformity of composition the firing temperature must be kept below the volatilization temperature of the constituent oxides and yet not so low that effective firing will not be obtained. In general, the firing temperature will fall within the range 2200° F. to 2600° F. By volatilization temperature is meant that temperature at which the oxide is converted into a vapor or gas.

In order to impart special characteristics to the instant compositions the titanates, stannates and zirconates of strontium, calcium, lead and magnesium may be substituted either individually or in combination for part of the $BaTiO_3$.

The electrodes contemplated are any of the materials commonly employed in ceramic capacitors. This invention is not limited to the particular process employed as long as the firing temperature does not exceed the indicated maximum. Many modifications of the present invention are possible in the light of the above disclosures.

What is claimed is:

1. A dielectric ceramic composition consisting essentially of a fired combination of a major proportion of barium titanate and from 1 to 8 weight percent of a member of the group consisting of $Nb_2O_5$ and $Fe_2O_3$; $Nb_2O_5$ and $LiNbO_3$; $LiNbO_3$; $Ta_2O_5$ and $Fe_2O_3$; $Ta_2O_5$ and $LiTaO_3$; and $LiTaO_3$ wherein the mole ratio of niobium oxide and tantalum oxide to iron oxide is from 2.5:1 to 25:1 and the mole ratio of niobium oxide and tantalum oxide to lithium oxide is from 1:1 to 10:1, said composition having been fired at a temperature below the volatilization temperature of the constituent oxides.

2. The composition of claim 1 containing $Nb_2O_5$ and $Fe_2O_3$.

3. The composition of claim 1 containing $Nb_2O_5$ and $LiNbO_3$.

4. The composition of claim 1 containing $LiNbO_3$.

5. The composition of claim 1 containing $Ta_2O_5$ and $Fe_2O_3$.

6. The composition of claim 1 containing $Ta_2O_5$ and $LiTaO_3$.

7. The composition of claim 1 containing $LiTaO_3$.

8. An electrical capicator comprising, the fired composition of claim 1 having counter electrodes affixed thereto.

References Cited by the Examiner

UNITED STATES PATENTS

| | | | |
|---|---|---|---|
| 2,695,239 | 11/1954 | Oshry | 106—39 |
| 2,989,483 | 6/1961 | Miller | 106—46 |

FOREIGN PATENTS

| | | |
|---|---|---|
| 755,860 | 8/1956 | Great Britain. |

TOBIAS E. LEVOW, *Primary Examiner.*

JOHN P. WILDMAN, *Examiner.*